United States Patent
Langford et al.

(10) Patent No.: US 10,761,500 B2
(45) Date of Patent: Sep. 1, 2020

(54) LOAD PREDICTION AND CONTROL OF ELECTRICAL NETWORK USING LOAD PROFILES

(71) Applicant: ORACLE INTERNATIONAL CORPORATION, Redwood Shores, CA (US)

(72) Inventors: Michael Paul Langford, Louisville, KY (US); Ian Kardien Wolcott Hoogendam, Minneapolis, MN (US); Andrew Gilbert Neddermeyer, Minnetrista, MN (US)

(73) Assignee: Oracle International Corporation, Redwood Shores, CA (US)

( * ) Notice: Subject to any disclaimer, the term of this patent is extended or adjusted under 35 U.S.C. 154(b) by 37 days.

(21) Appl. No.: 16/010,632

(22) Filed: Jun. 18, 2018

(65) Prior Publication Data

US 2019/0146437 A1 May 16, 2019

Related U.S. Application Data

(60) Provisional application No. 62/585,113, filed on Nov. 13, 2017.

(51) Int. Cl.
*G05B 19/42* (2006.01)
*G05B 19/042* (2006.01)

(52) U.S. Cl.
CPC .... *G05B 19/042* (2013.01); *G05B 2219/2639* (2013.01)

(58) Field of Classification Search
CPC .............. G05B 19/042; G05B 2219/2639
See application file for complete search history.

(56) References Cited

U.S. PATENT DOCUMENTS

| 2005/0207081 | A1* | 9/2005 | Ying | H01H 9/32 361/105 |
| 2011/0153103 | A1* | 6/2011 | Brown | G06Q 10/04 700/291 |
| 2012/0259474 | A1* | 10/2012 | Razum | G06Q 10/06 700/291 |
| 2017/0317495 | A1* | 11/2017 | Pavlovski | G01R 22/00 |

* cited by examiner

*Primary Examiner* — Thomas C Lee
*Assistant Examiner* — Anzuman Sharmin
(74) *Attorney, Agent, or Firm* — Kraguljac Law Group, LLC

(57) ABSTRACT

Systems, methods, and other embodiments associated with load prediction using load profiles are described. In one embodiment, a method includes receiving weather information for a plurality of geographical regions, and receiving load information from a plurality of meters located in the plurality of geographical regions. A load profile is generated for each of the geographical regions. Each load profile is generated based upon (i) weather information corresponding to a geographical region and (ii) load information corresponding to one or more meters located within the geographical region. A loading is predicted for each geographical region based upon a load profile for the geographical region. A determination is made as to whether the predicted loading for each geographical region exceeds a defined threshold. In response to a first predicted loading for a first geographical region exceeding the defined threshold, a geographical representation of the first geographical region is distinguished.

17 Claims, 13 Drawing Sheets

WEATHER AND LOAD DATA STRUCTURE — 130

| TIME (305) | LOAD (310) | TEMPERATURE (315) | GEOGRAPHICAL REGION (320) |
|---|---|---|---|
| VALUE (1) | VALUE (1) | VALUE (1) | GEOGRAPHICAL REGION (1) |
| VALUE (2) | VALUE (2) | VALUE (2) | GEOGRAPHICAL REGION (2) |
| VALUE (3) | VALUE (3) | VALUE (3) | GEOGRAPHICAL REGION (3) |
| VALUE (4) | VALUE (4) | VALUE (4) | GEOGRAPHICAL REGION (4) |
| VALUE (5) | VALUE (5) | VALUE (5) | GEOGRAPHICAL REGION (5) |

LOAD PREDICTION AND CONTROL OF ELECTRICAL NETWORK USING LOAD PROFILES

RELATED APPLICATION

This application claims the benefit of U.S. Provisional Application No. 62/585,113, filed Nov. 13, 2017, which is incorporated herein by reference in its entirety.

BACKGROUND

Computing devices are used to implement various services and products. For example, a computing device may be used to run a power monitoring service. The power monitoring service may be configured to monitor the distribution of power across an electrical network.

The power monitoring service is designed to gather many types of power-related data from the electrical network. For example, the power-related data can include an amount of power or load of each portion of the electrical network.

The power-related data assembled by the power monitoring service can be used to perform a task. For example, the power-related data can be used to determine power flow in the electrical network. The power-related data can also be used to identify failures that occur in the electrical network. The settings or the components of the electrical network that caused the failures can then be modified to address the failures.

Waiting to modify settings or components of the electrical network after failures have occurred can be resource-intensive and expensive. Until the necessary modifications are made, the failures can result in the impairment of functionality of parts of the electrical network. Devices that rely upon the electrical network can thus be rendered inoperable.

In order to improve the performance of the electrical network, decrease the down-time of the electrical network, and mitigate the losses caused by failures in the electrical network, it is desirable for the providers of the power monitoring services to be able to predict the state of the electrical network and make any needed modifications prior to the occurrence of failures.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 3D illustrates an embodiment of a system associated with load prediction using load profiles, where weather information and load information is stored in a weather and load data structure.

DETAILED DESCRIPTION

Figure 1:
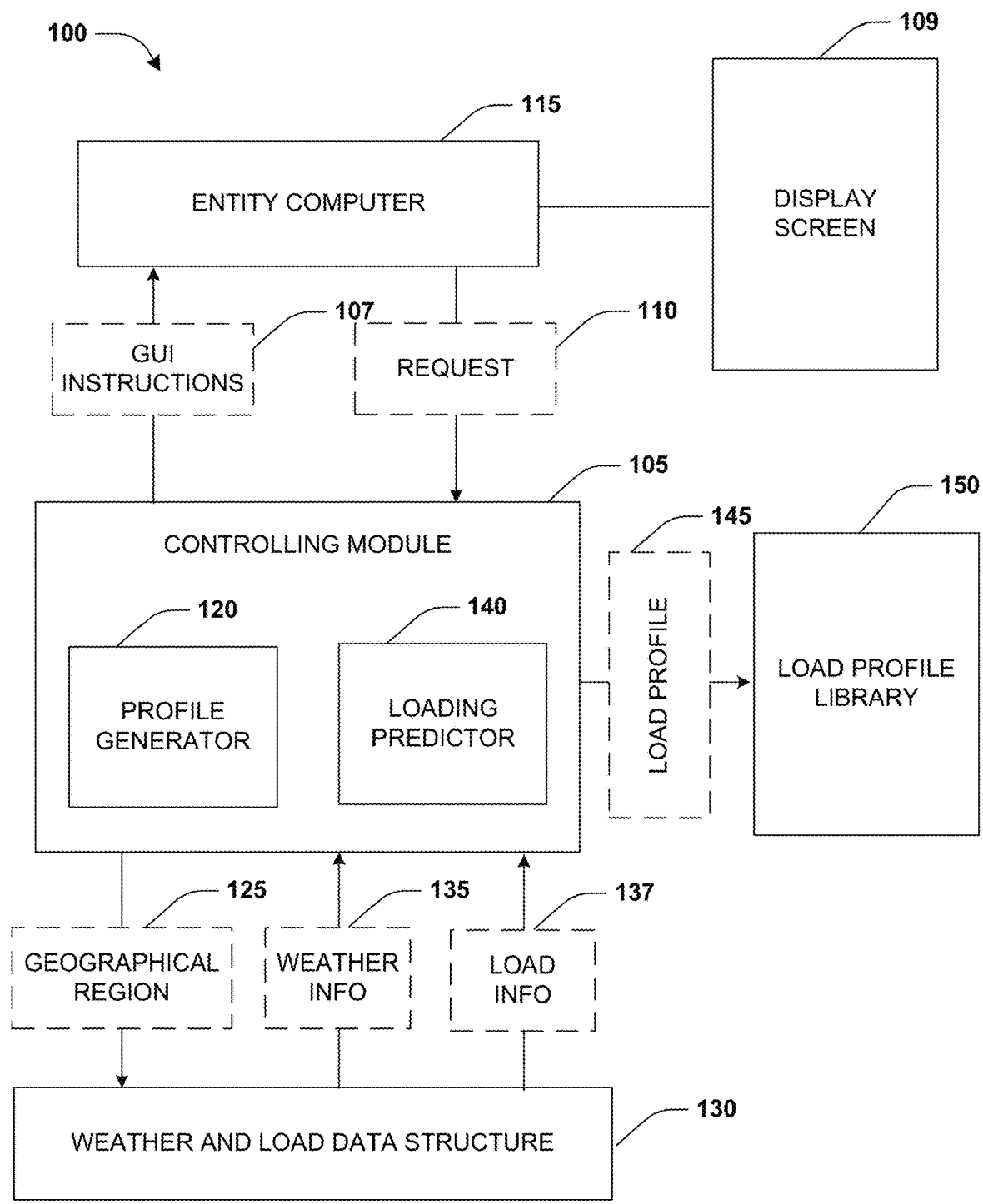
FIG. 1 illustrates an embodiment of a system associated with load prediction using load profiles.

Computerized systems and methods are described herein that generate load profiles for geographical regions and predict loadings for the geographical regions using the generated load profiles. In one embodiment, weather information, load information and time information for various geographical regions are retrieved. A load profile is generated for loads within each of the geographical regions based upon the weather information, load information and time information associated with the geographical region.

The weather information may be retrieved from a source of weather data. For example, the source may be a publically accessible source, such as the National Weather Service (NWS) of the National Oceanic and Atmospheric Administration (NOAA). The weather information may include temperature information, cloud cover information, or wind information, for example.

Each geographical region can correspond to a country, a state, a city, a neighborhood, a block, or a segment of those regions. For example, each geographical region can comprise a group of building structures sharing a common energy distribution device. Each building structure includes at least one meter configured to control and/or measure power usage of the corresponding building structure.

The load information may be retrieved from meters, such as electrical meters, located in the geographical regions. Each meter is configured to collect data about power flow through a portion of an electrical network. The load information may include information about electric power consumed by loads in the geographical regions.

The time information may be retrieved with, or generated for, the weather information and the load information. In one embodiment, the time information includes timestamps associated with the various values of the weather information and the load information. For example, a first timestamp in the time information may indicate a first date and time when a first geographical region had a first temperature, while a second timestamp in the time information may indicate a second date and time when a second geographical region had a second load.

Accurate prediction of loading for a geographical region can depend upon the generation of an accurate load profile for the loads within each geographical region. Generation of an accurate load profile for the geographical region can depend upon properly considering information that is associated with the geographical location. For example, parameters that have a direct relationship or correlation with load may be used to generate each load profile.

The disclosed system for load prediction using load profiles improves existing technological processes for predicting load by generating a load profile for loads within each geographical region based upon a combination of one or more of weather information, load information and/or time information. In one embodiment, the present system uses weather information to build a load profile. The weather information may include temperature information, cloud cover information or wind information. Thus, the present system improves existing technological processes for load prediction using load profiles by not depending merely upon time information and load information while failing to use weather information, as done in existing techniques.

The present system also improves existing technological processes for distributing power in an electrical network or utility grid by mitigating failures (e.g., shortages) in the electrical network. In one embodiment, the present system accurately predicts whether a loading will exceed a defined threshold, and thus enables corrective actions to be implemented to avoid or minimize the failures. The failures can be preempted by modifying operation of hardware, rerouting energy flow, or repairing or replacing one or more components of the hardware. By doing so, the system solves technical problems relating to errors, time delays and wasted resources caused by the failures.

With reference to FIG. 1, one embodiment of a computerized system 100 associated with load prediction using load profiles is illustrated. A controlling module 105 generates graphical user interface instructions 107. The controlling module 105 transmits the graphical user interface instructions 107 to an entity computer 115.

The entity computer 115 executes the graphical user interface instructions 107 to display a graphical user interface including at least a plurality of selectable inputs on a display screen 109. The graphical user interface on the display screen 109 is used by the entity computer 115 to generate a request 110 that load profiles be generated for a plurality of geographical regions. The load profiles that are to be generated may be configured to be usable to predict loads for the plurality of geographical regions. The entity computer 115 transmits the request 110 to the controlling module 105 over a network connection.

The controlling module 105 generates geographical regions 125 (based upon the request 110) that are used to select information to be used to generate the load profiles. In one embodiment, the geographical regions 125 reflect selectable inputs that were selected by a user of the graphical user interface on the display screen 109 to generate the request 110. For example, the geographical regions 125 may specify that load profiles be generated for one or more cities from designated areas.

The geographical regions 125 are used to analyze a weather and load data structure 130 in order to identify data records to be considered for the request 110. The weather and load data structure 130 includes data records of weather information and load information that are available to be implemented for load profile generation.

The controlling module 105 uses the weather and load data structure 130 to generate weather information 135 associated with the geographical regions 125 and load information 137 associated with the geographical regions 125. For example, the controlling module may select weather information and load information in the weather and load data structure 130 that matches the geographical regions 125 determined from the request 110.

The controlling module 105 utilizes a profile generator 120 to generate a load profile 145 for loads within each geographical region of the geographical regions 125 based upon the weather information 135 and the load information 137. In some embodiments, the load profile 145 is stored in a load profile library 150. The load profile library 150 may be stored on a remote target server, or may be local to the controlling module 105.

The controlling module 105 utilizes a loading predictor 140 to predict loading for each geographical region based upon the load profile 145 for the geographical region. In some embodiments, the predicted loading corresponds to a total amount of power expected to be consumed. In some embodiments, the predicted loading corresponds to a difference between the power expected to be consumed and the power expected to be provided. The controlling module 105 determines whether the predicted loading for each geographical region exceeds a defined threshold.

In response to a first predicted loading for a first geographical region exceeding the defined threshold, the display screen 109 is controlled to generate and display a graphical representation of the first geographical region that is visually distinguished from graphical representations of other geographical regions that are displayed on the display screen 109. For example, in the display screen 109, the first geographical region may be distinguished from graphical regions with predicted loadings that do not exceed the defined threshold.

The visually distinguished graphics, in one embodiment, may function as an alert so that attention is directed to the first geographical region to cause a corrective action to address any issues with the predicted loading. In one embodiment, the corrective action may include transmitting control signals to an appropriate device(s) to make adjustments and/or change settings in the electrical network/utility grid of the first geographical region. In another embodiment, an electronic message may be generated and transmitted to a designed device to provide notice of the predicted loading to cause a corrective action to be performed to the electrical network/utility grid.

The present process thus improves the efficiency, timeliness, and accuracy to identify potential load issues in a specific regional of a utility grid as compared to prior processes. The present process also improves on responding to such load issues with a corrective action as compared to prior processes. The present process also improves the electrical network by mitigating failures (e.g., power shortages) in the electrical network. Power shortages may be mitigated by more quickly and accurately identifying regions with potential load issues as described herein, and taking a corrective action in advance of a shortage by changing power distribution settings, for example.

Thus, system is used to generate load profiles of geographical regions, predict loadings using the load profiles, accurately highlight the one or more geographical regions that are likely to have a loading exceeding a defined threshold and/or accurately highlight the devices within the one or more geographical regions that are likely to have the loading exceeding the defined threshold. This decreases the time and resources that would otherwise need to be used to manually monitor the load associated with an electrical network to identify or prevent failures. The graphical user interface on the display screen 109 is accessible from any computing device than can establish a network connection with the controlling module 105, which increases the ease with which the loadings can be predicted.

Figure 2:
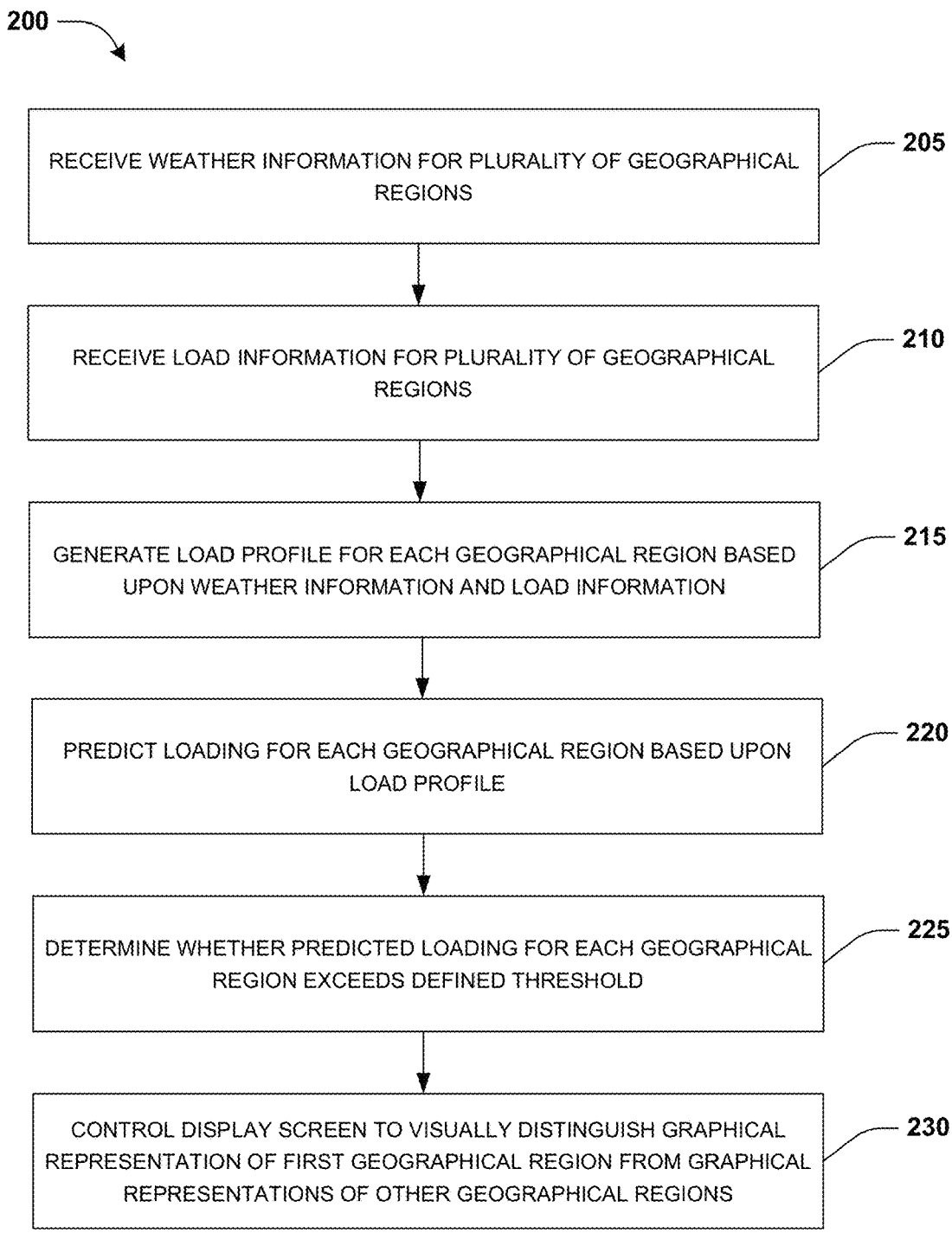
FIG. 2 illustrates an embodiment of a method associated with load prediction using load profiles.

With reference to FIG. 2, one embodiment of a computer implemented method 200 associated with load prediction using load profiles is illustrated. In one embodiment, the method 200 is performed by the controlling module 105 utilizing various computing resources of the computer 515. The computing resources, such as the processor 520, are used for executing instructions associated with load prediction using load profiles as described herein. Memory 535 and/or disks 555 are used for storing data structures of commands for performing load prediction using load profiles as described herein. Network hardware is used for communication of load profile generation commands, weather information, load information, time information, load profiles, and/or graphical user interface data between the computer 515 and remote computers over a network, such as for providing a load prediction interface to devices. The method 200 is triggered upon determining that a load profile generation command is to be executed.

In one embodiment, the controlling module 105 generates graphical user interface instructions 107 that cause the entity computer 115 to generate the graphical user interface displayed on the display screen 109. A network connection is established between the controlling module 105 and the entity computer 115. The graphical user interface instructions 107 for the graphical user interface are transmitted to the entity computer 115 over the network connection.

In some examples, the graphical user interface instructions 107 are provided in response to receiving a request from the entity computer 115 for a load profile interface. The request may have been generated by a web browser operating on the entity computer 115. In one embodiment, the request may have been generated as a part of a web application.

Figure 3A:
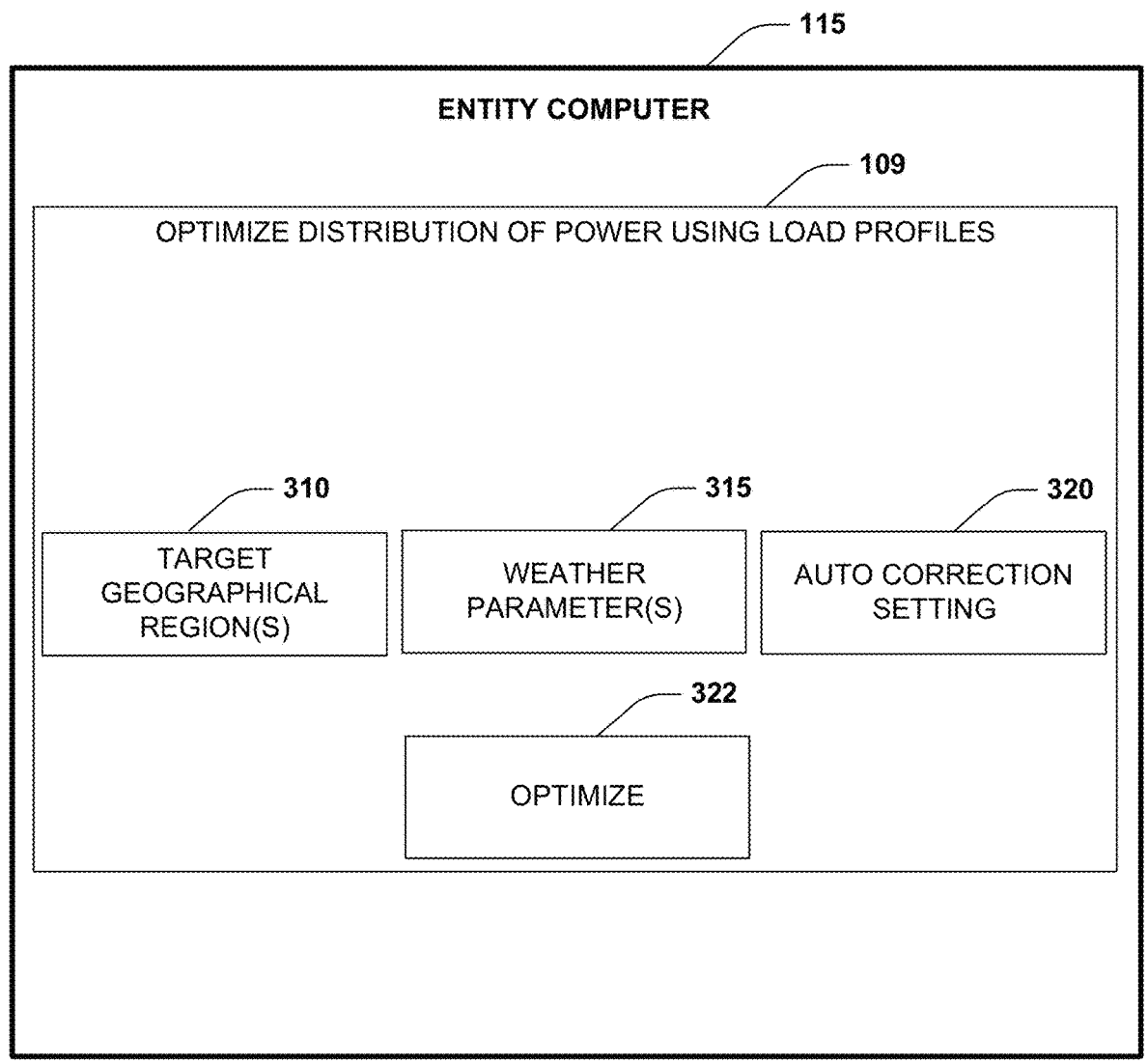
FIG. 3A illustrates an embodiment of a system associated with load prediction using load profiles, where a graphical user interface is displayed.

Upon receiving the graphical user interface instructions 107, the entity computer 115 uses the graphical user interface instructions 107 to control the display screen 109 to display the graphical user interface, as illustrated in FIG. 3A. In some examples, the graphical user interface is rendered within the web browser.

In one embodiment, the graphical user interface on the display screen 109 includes a load profile interface. The load profile interface includes a plurality of selectable inputs. The selectable inputs of the load profile interface can be used (by a user of the entity computer 115) to define a request to optimize power distribution by generating load profiles and predicting loads using the load profiles.

In one embodiment, the display screen 109 is controlled to generate and display multiple input options, for example, a first selectable input 310, a second selectable input 315, and a third selectable input 320 in the graphical user interface, as illustrated in FIG. 3A. Different amounts of input options may be implemented. Each selectable input can be a menu comprising a plurality of options, a text input box, or another type of input.

The first selectable input 310 is configurable to define the target geographical regions for which load profiles are to be generated and loadings are to be predicted. In some examples, the first selectable input 310 may be used to receive a target address of each target geographical region, or another geographical identifier, such as a zip code, a city name, a state name, a country name, a county name, GPS coordinates, etc. Alternatively and/or additionally, the first selectable input 310 may include a graphical map with a plurality of selectable regions.

The second selectable input 315 is configurable to define one or more weather parameters to be used to generate load profiles. The weather parameters can include temperature, wind, sunshine or cloud cover. Alternatively and/or additionally, weather parameters can include sources from which weather data may be retrieved, such as various weather-related websites.

The third selectable input 320 is configurable to define one or more corrective action settings applicable to predicted loadings. For example, the corrective action settings can specify one or more corrective actions to automatically be implemented for predicted loadings that exceed a defined threshold. In some examples, the corrective action settings can specify conditions for automatically implementing the corrective actions, such as specifying the defined threshold.

In some examples, the display screen 109 is controlled to generate and display one or more additional selectable inputs in the graphical user interface. For example, a fourth selectable input may be configurable to define one or more sources of load information to be used to generate load profiles. A fifth selectable input may be configurable to define the load profile library 150 within which the generated load profiles can be stored.

The target geographical regions defined via the first selectable input 310 and the weather parameters defined via the second selectable input 315 can later be used as criteria for determine which data to extract, and which data to not extract. The values defined for each selectable input can be transmitted to the controlling module 105 in response to selection of an activation button 322 configured to start the generation of load profiles for load prediction.

The graphical user interface on the display screen 109 would be accessible from various remote devices in a centralized manner, as the graphical user interface would serve as a connection to a single location which the various remote devices could access to launch the generation of load profiles for load prediction. The centralized nature of the graphical user interface eliminates the need to access multiple interfaces at multiple locations in order to launch the generation of load profiles for load prediction.

Figure 3B:
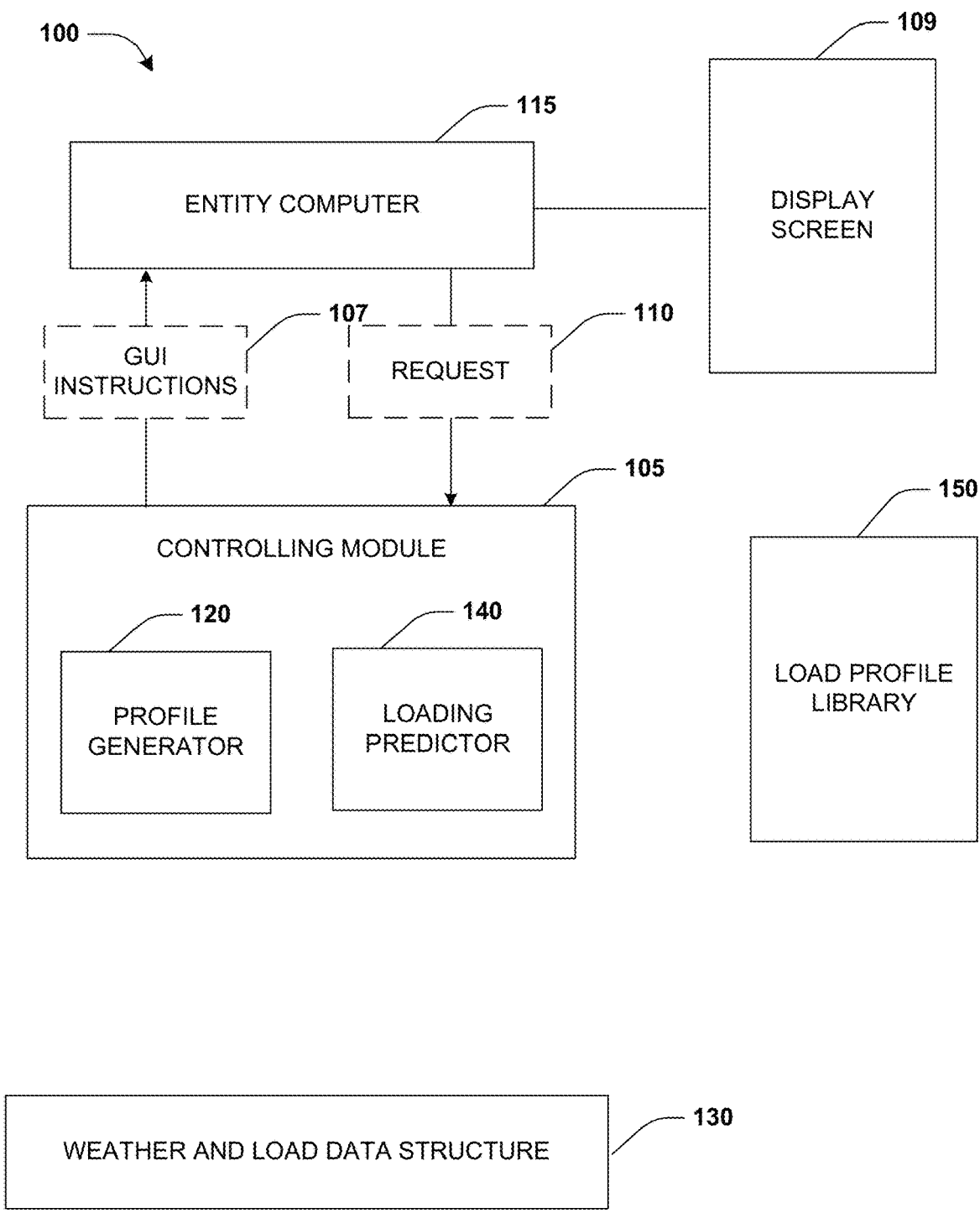
FIG. 3B illustrates an embodiment of a system associated with load prediction using load profiles, where a request associated with load prediction using load profiles is received.

Selection of the activation button 322 causes the entity computer 115 to generate the request 110. The request 110 is transmitted via the network connection to the controlling module 105, as illustrated in FIG. 3B.

In some embodiments, the controlling module 105 receives the request 110. The controlling module 105 parses the request 110 to identify criteria for generating load profiles for load prediction. The criteria includes the target geographical regions and the weather parameters specified in the request 110. The criteria can also include other information that may be used to predict or filter other parameters used to generate load profiles, such as a span of time.

Figure 3C:
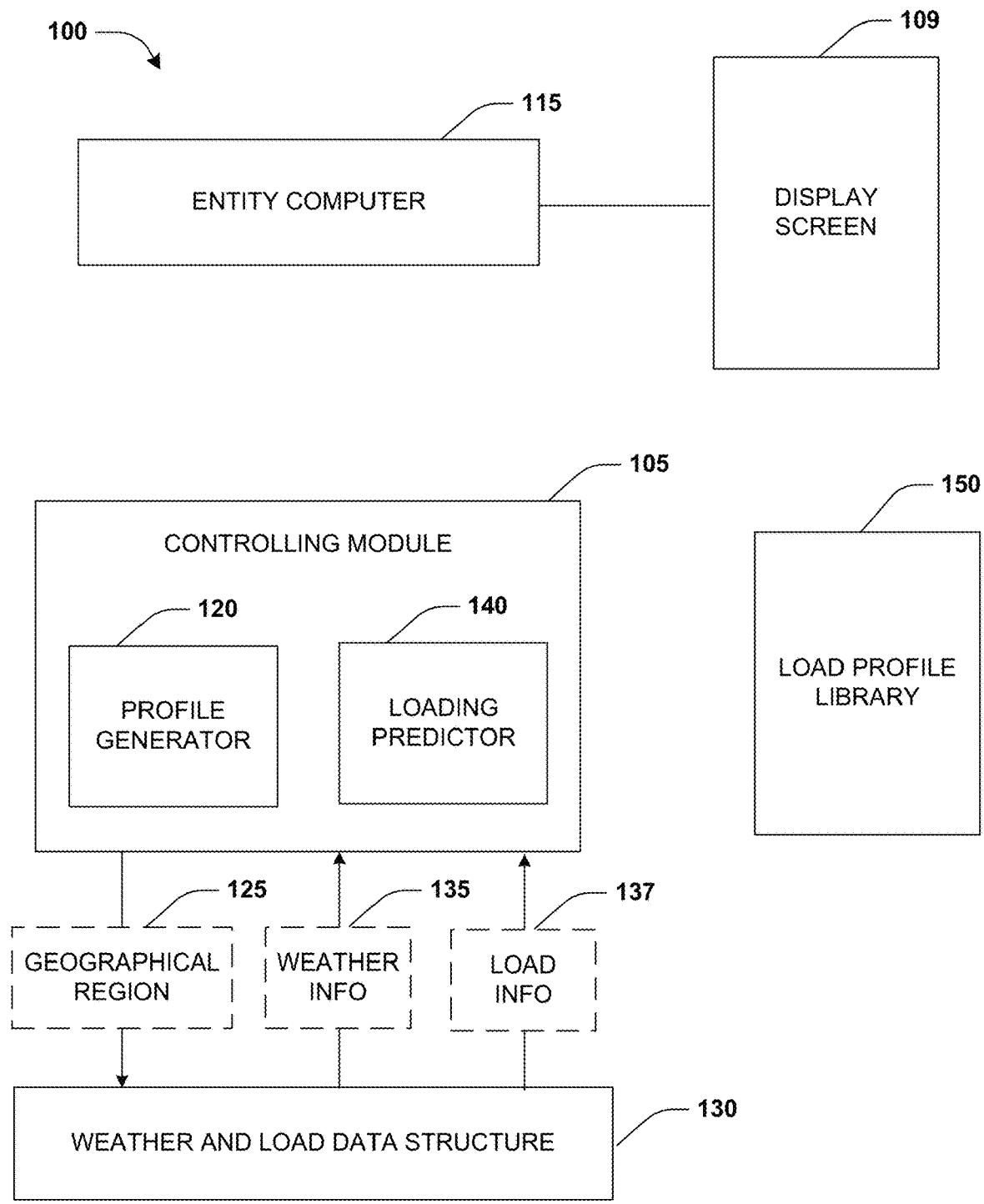
FIG. 3C illustrates an embodiment of a system associated with load prediction using load profiles, where weather information and load information is received.
Figure 3E:
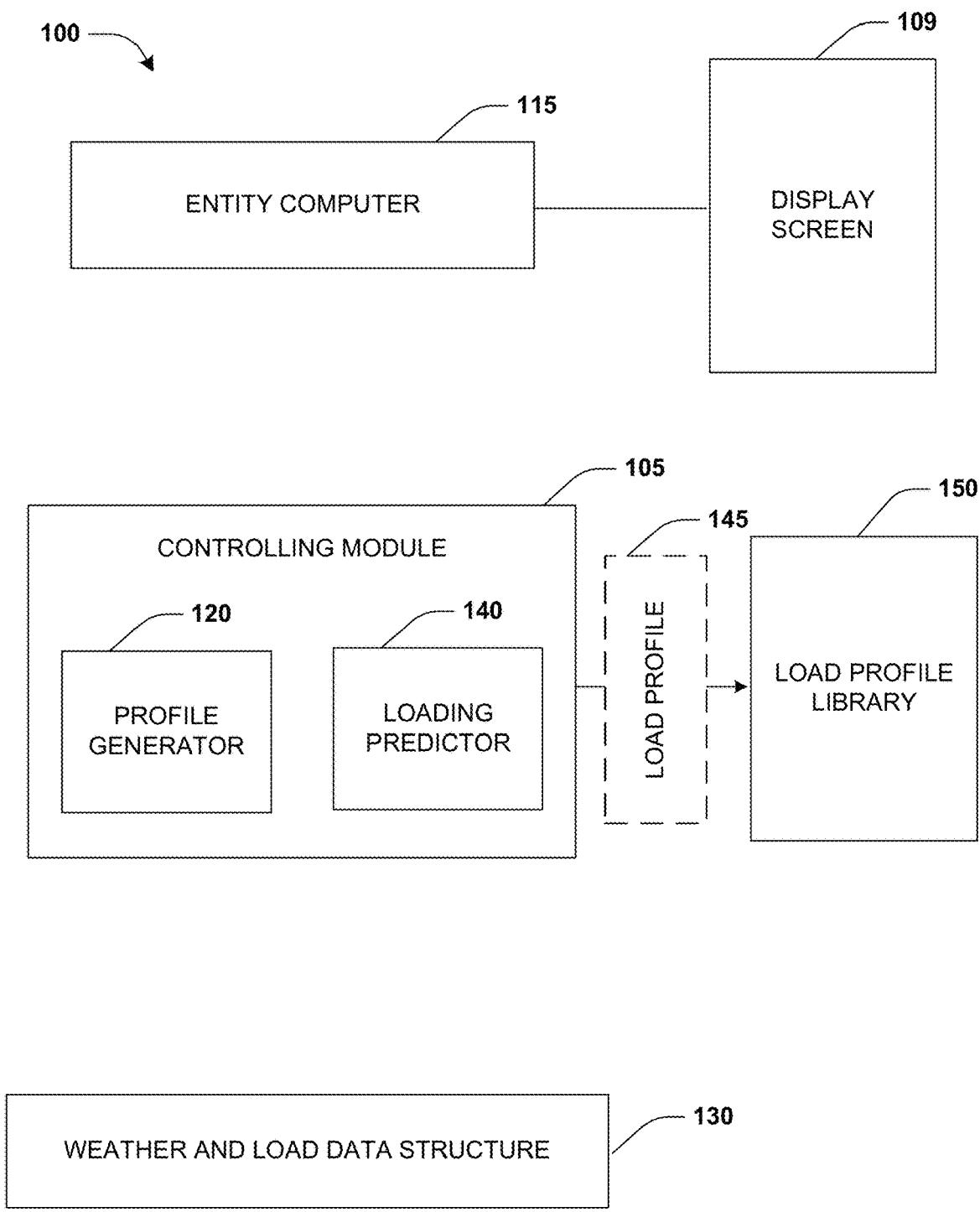
FIG. 3E illustrates an embodiment of a system associated with load prediction using load profiles, where a load profile is generated.

The controlling module 105 extracts the geographical regions 125 from the criteria. The geographical regions 125 are used to analyze the weather and load data structure 130, as illustrated in FIG. 3C. In one embodiment, entries in the geographical regions 125 are compared to entries in the weather and load data structure 130.

In some embodiments, time information, load information and/or weather information are selected from the entries listed in the weather and load data structure 130. For example, matches between the entries in the geographical regions 125 and the entries in the weather and load data structure 130 may be used to select time information, load information and/or weather information associated with the matching geographical regions.

The selected time information, load information and/or weather information include information that can be used in the generation of load profiles for load prediction. The selected weather information is retrieved from the weather and load data structure 130 and used to generate the weather information 135. The selected load information is retrieved from the weather and load data structure 130 and used to generate the load information 137. In some examples, the selected time information is retrieved from the weather and load data structure 130.

FIG. 3D illustrates an example of entries stored in the weather and load data structure 130. The entries may be arranged based upon relationships between each geographical region 320 and one or more time attributes 305, one or more load attributes 310, and one or more temperature attributes 315 associated with each geographical region 320. For example, a first geographical region corresponding to a city may have a first attribute that is a first time when information about the city was recorded, a second attribute that is a load of the city at the first time, and a third attribute that is a temperature of the city at the first time.

In one embodiment, load information in the weather and load data structure 130 was retrieved from meters in various geographical regions and stored in the weather and load data structure 130. Weather information in the weather and load data structure 130 was retrieved from weather sources and stored in the weather and load data structure 130. Time information in the weather and load data structure 130 was extracted from the load information or the weather information and stored in the weather and load data structure 130. Alternatively and/or additionally, the time information may be estimated.

In one embodiment, each entry in the geographical regions 125 that identifies a geographical region is compared to the entries of the geographical region parameter 320. In one embodiment, each entry in the geographical regions 125 that identifies one or more attributes is compared to the entries of the time attributes 305, the load attributes 310 and/or the temperature attributes 315.

As mentioned, the time information, load information and/or weather information associated with matching entries are retrieved from the weather and load data structure 130. Thus, at 205, the weather information 135 is received by the controlling module 105, as illustrated in FIG. 3C. At 210, the load information 137 is received by the controlling module 105. In some examples, the time information is also received by the controlling module 105.

At 215, the profile generator 120 generates a load profile for loads within each geographical region based upon the weather information 135 and the load information 137. For example, a load profile may be generated for loads within each geographical region specified by the request 110 and/or the geographical regions 125. The load profile for each geographical region may be generated based upon weather records (in the weather information 135) that are associated with the geographical region, load records (in the load information 137) that are associated with the geographical region and/or time records (in the time information) that are associated with the geographical region. In some embodiments, the load information 137 includes information retrieved from an electrical meter.

In one embodiment, the load profile for loads within each geographical region may be multidimensional (e.g., two dimensional, three dimensional, etc.). For example, a first dimension of the load profile may be load, a second dimension of the load profile may be weather, and/or a third dimension of the load profile may be time. A first load profile for a first geographical region may thus indicate that at a first time, the first geographical region had first weather and a first load, that at a second time, the first geographical region had second weather and a second load, etc.

In one embodiment, the load profile for each geographical region has one or more parameters for each dimension of the load profile. For example, the first dimension pertaining to load can have a first parameter associated with a load type, a second parameter associated with a number of meters from which data was retrieved, or a third parameter associated with a number of measurements that were taken. One or more of the first parameter, the second parameter or the third parameter can be combined to generate a representation of the first dimension pertaining to load.

The second dimension pertaining to weather can have a first parameter associated with a temperature band minimum, a second parameter associated with a temperature band maximum, a third parameter associated with a number of weather measurements taken, a fourth parameter associated with a cloud cover band minimum, a fifth parameter associated with a cloud cover band maximum, a sixth parameter associated with a wind band minimum, or a seventh parameter associated with a wind band maximum. One or more of the first parameter, the second parameter, the third parameter, the fourth parameter, the fifth parameter, the sixth parameter or the seventh parameter of the second dimension can be combined to generate a representation of the second dimension pertaining to weather.

The third dimension pertaining to time can have a first parameter associated with a type of day, a second parameter associated with an hour, a third parameter associated with a start date of a rolling average, or a fourth parameter associated with an end date of the rolling average. One or more of the first parameter, the second parameter, the third parameter or the fourth parameter can be combined to generate a representation of the third dimension pertaining to time. The representation of the first dimension pertaining to load, the representation of the second dimension pertaining to weather, and the representation of the third dimension pertaining to time are used to generate the load profile, for example.

In one embodiment, the load profiles 145 are stored in the load profile library 150. The load profile library 150 may be hosted on the same server as the controlling module 105, or on a different device accessed by the controlling module 105 via a network connection. The load profile library 150 may host load profiles that can be used to make load predictions for the geographical regions associated with the load profiles (e.g., in response to requests from remote devices). Alternatively and/or additionally, the load profiles hosted by the load profile library 150 may automatically be updated or replaced based upon new weather information, load information and/or time information that is received in association with each geographical region.

Figure 3F:
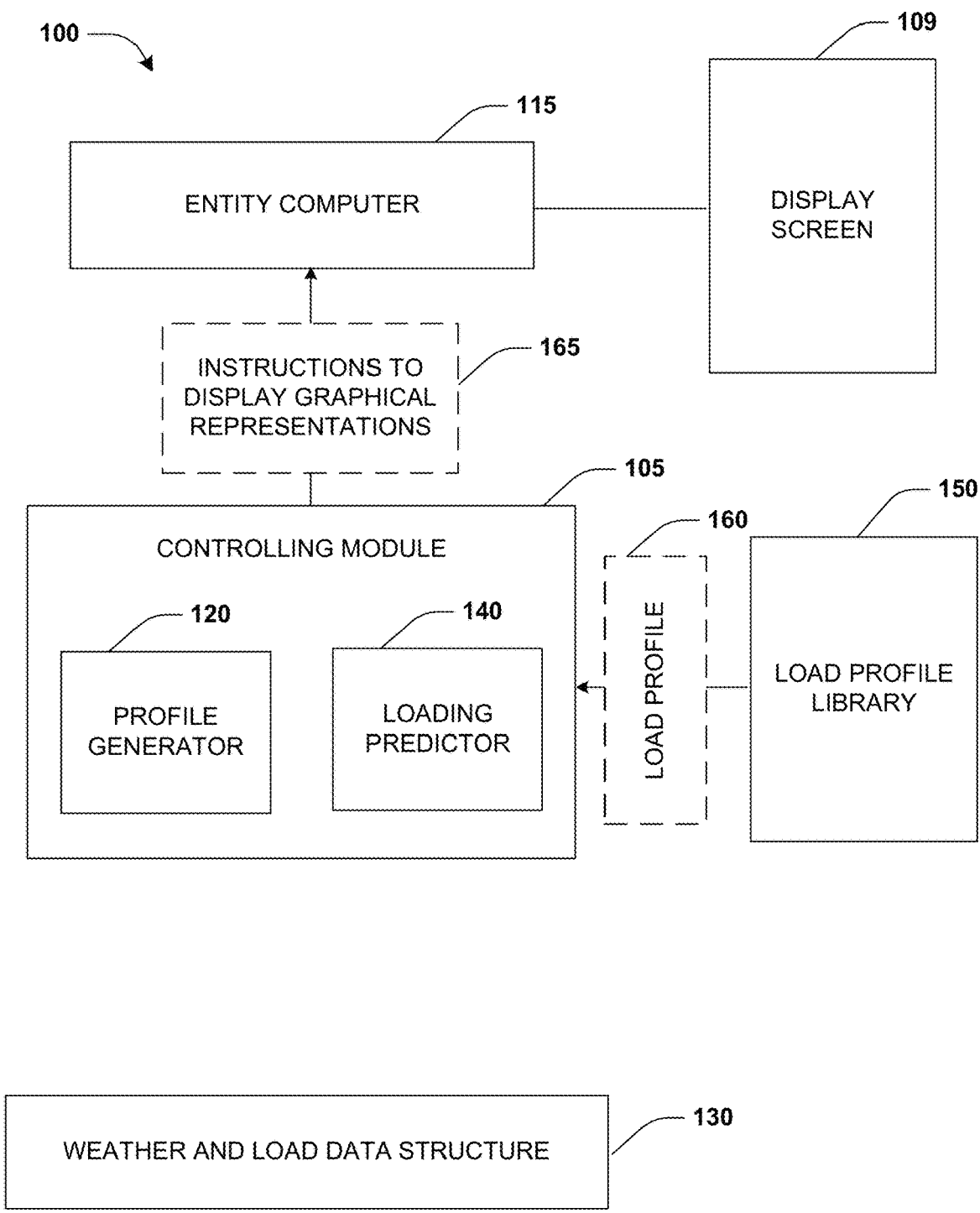
FIG. 3F illustrates an embodiment of a system associated with load prediction using load profiles, where instructions to display graphical representations are transmitted.

At 220, the loading predictor 140 is used by the controlling module 105 to predict loading for each geographical region of the plurality of geographical regions based upon the load profile for the geographical region. For example, the request 110 may request that the load of the first geographical region be predicted for a first time (e.g., March 20). A determination may be made that according to the first load profile, at the first time, the first geographical region had, on average, a first load. The first load profile may be among one or more load profiles 160 retrieved from the load profile library 150, as illustrated in FIG. 3F.

Alternatively and/or additionally, a determination may be made that the first time is associated with first weather (e.g., a forecast of 70 degrees Fahrenheit). Another determination may be made that according to the first load profile, during first weather, the first geographical region had, on average, a second load. Accordingly, the first geographical region may be predicted to have a third load based upon the first load and/or the second load. For example, the third load may be an average of the first load and the second load.

At 225, a determination is made as to whether the predicted loading for each geographical region exceeds a defined threshold. In some embodiments, the predicted loading for a geographical region corresponds to a total amount of power expected to be consumed in the geographical region. Thus, the defined threshold may be a non-zero value (e.g., 200), and the predicted loading may be determined to exceed the defined threshold if more than the non-zero value amount of power (e.g., 300) is expected to be consumed in the geographical region.

In some embodiments, the predicted loading corresponds to a difference between the power expected to be consumed in the geographical region and the power expected to be provided/available in the geographical region. Thus, the defined threshold may be zero, and the predicted loading may be determined to exceed the defined threshold if more power is expected to be consumed than provided.

A determination may be made that the first predicted loading for the first geographical region exceeds the defined threshold. The controlling module 105 generates display graphical representations instructions 165 based upon the first predicted loading exceeding the defined threshold. The display graphical representations instructions 165 may specify that the first predicted loading exceeds the defined threshold and/or that the first geographical region is to be distinguished from other geographical regions. The controlling module 105 establishes a network connection to the entity computer 115, and transmits the display graphical representations instructions 165 to the entity computer 115.

Figure 3G:
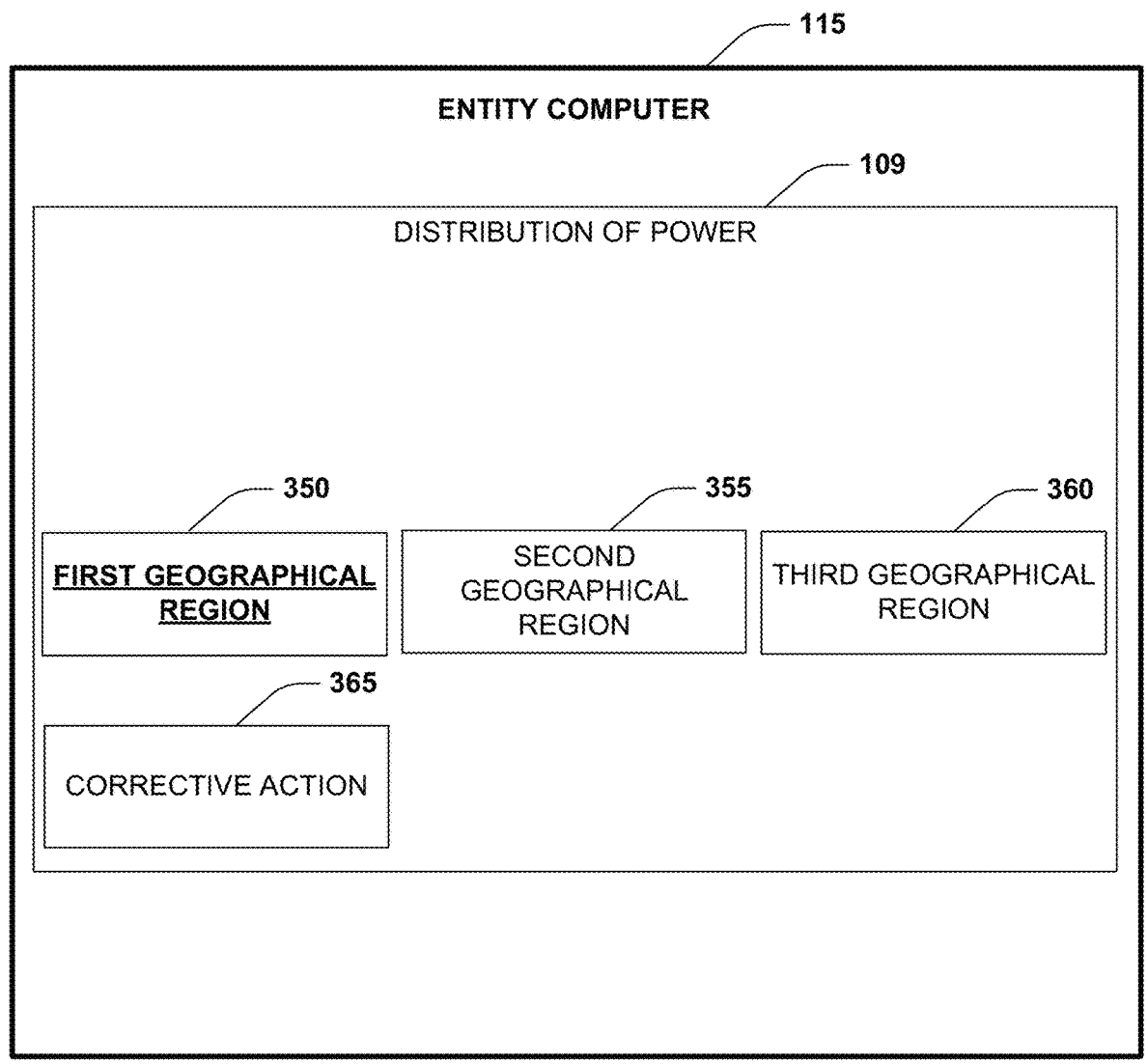
FIG. 3G illustrates an embodiment of a system associated with load prediction using load profiles, where the graphical user interface is controlled to visually distinguish a graphical representation of a first geographical region.

The display graphical representations instructions 165 are executed by the entity computer 115. Thus, at 230, the display screen 109 is controlled to generate and display a first graphical representation 350 of the first geographical region in a visually distinguished form or graphic from graphical representations of other geographical regions displayed on the display screen 109, as illustrated in FIG. 3G. The first graphical representation 350 of the first geographical region is highlighted and thus distinguished from the second graphical representation 355 of a second geographical region and the third graphical representation 360 of a third geographical region, for example. In one embodiment, other graphical representations associated with geographical regions predicted to have loadings that exceed the defined threshold may also be highlighted.

In one embodiment, the first graphical representation 350 is visually distinguished from other graphical representations by giving the first graphical representation 350 a format, color, size, order, and/or other feature that is different than that of the remaining, non-distinguished graphical representations. In one embodiment, the first graphical representation 350 is visually distinguished from other graphical representations by displaying the first graphical representation 350 and not displaying the remaining, non-distinguished graphical representations.

As previously stated, the visually distinguished graphics may function as an alert so that attention is directed to the first geographical region to cause a corrective action to address any issues with the predicted loading. In one embodiment, the corrective action may include transmitting control signals to an appropriate device(s) to make adjustments and/or change settings in the electrical network/utility grid of the first geographical region. For example, control signals can cause electrical distributions in a power distribution device to be adjusted to improve the power supply (e.g., increase or decrease power) in the select region.

In another embodiment, an electronic message may be generated and transmitted to a designed device to provide notice of the predicted loading to cause a corrective action to be performed to the utility grid.

In one embodiment, the display screen 109 is controlled to generate and display a corrective action input 365. The corrective action input 365 is configured to enable the selection and/or activation of one or more corrective actions associated with the first geographical region. The one or more corrective actions may be configured to make changes to settings of selective devices in the utility grid that cause the first geographical region to have a corrected loading that does not exceed the defined threshold. In one embodiment, the corrective actions may be configured to also make changes for other geographical regions predicted to have loadings that exceed the defined threshold.

Corrective actions for a geographical region can include modifying operation of hardware, rerouting energy flow, or repairing or replacing one or more components of the hardware. In one embodiment, various possible corrective actions may be evaluated and scored, and one or more corrective actions with the highest scores may be selected and implemented. The scoring may be based upon efficiency, expense, time delay, or interruption associated with each corrective action.

Instructions to perform the selected corrective actions may be generated. The instructions may be transmitted to a remote device via a network connection. The corrective instructions, when executed, may cause the remote device to perform the actions to avoid or remedy the exceeding of the defined threshold by the predicted loading for one or more geographical regions.

In one embodiment, a determination may be made as to whether a distributed energy resource is installed in the first geographical region. The distributed energy resource may be a solar power device, a wind turbine, or another device that generates energy that can supplement the power provided by the electrical network in the first geographical region. In some examples, the determination may be based upon a scanning of a list of distributed energy resource stored by a utility resource company, and selecting one or more distributed energy resources in the list that match the first geographical region. In other examples, the determination may be based upon image analysis of satellite images of the first geographical region, and determining whether any portion of the satellite images includes a representation of a distributed energy resource.

In response to determining that the distributed energy resource is installed in the first geographical region, supplemental load information associated with the distributed energy resource may be determined. The supplemental load information may include an amount of energy the distributed energy resource provides at a given time.

The first load profile for the first geographical region may be generated or updated based upon the supplemental load information. For example, the amount of energy the distributed energy resource provides at the given time may be added to the load of the first geographical region at the given time. After all, the load may account for the energy provided by an electrical network but may not account for the energy that was provided by the distributed energy resource. The first load profile for the first geographical region may thus be generated or updated to indicate that at the given time, the actual load was the sum of the amount of energy the distributed energy resource provided at the given time and the load of the geographical region at the given time.

In one embodiment, a weather factor may be determined to impact the supplementation of energy via the distributed energy resource. For example, if the distributed energy resource is a solar power device, cloud cover may be determined to impact the supplementation of energy. Supplemental load information, such as the amount of energy the distributed energy resource is expected to provide, may be determined based upon a value (e.g., very cloudy) of the weather factor that is applicable at a given time (e.g., 7 am).

The first load may be predicted for the first geographical region (at the given time) based upon the supplemental load information. For example, the distributed energy resource is predicted to provide little or no energy on a very cloudy day, and thus the first load may not be impacted (e.g., lowered) significantly due to the presence of the distributed energy resource.

Second supplemental load information, such as the amount of energy the distributed energy resource is expected to provide, may be determined based upon a second value (e.g., not cloudy) of the weather factor that is applicable at a different time (e.g., 3 pm). A second load may be predicted for the first geographical region (at the different time) based upon the supplemental load information. For example, the distributed energy resource may be predicted to provide a significant amount of energy on a cloudless day, and thus the second load may be impacted (e.g., lowered) significantly due to the presence of the distributed energy resource.

In some embodiments, a plurality of load profiles may be generated for a single geographical region. For example, a customer may have one load profile for "Sunny" conditions and another load profile for "Cloudy" conditions. If a location of the customer was predicted to be "Sunny" from 9 am-1 pm and then "Cloudy" from 1 pm-6 pm, the load profile for "Sunny" may be used to predict loading at a time between 9 am-1 pm while the load profile for "Cloudy" may be used to predict loading at a time between 1 pm-6 pm.

Figure 4:
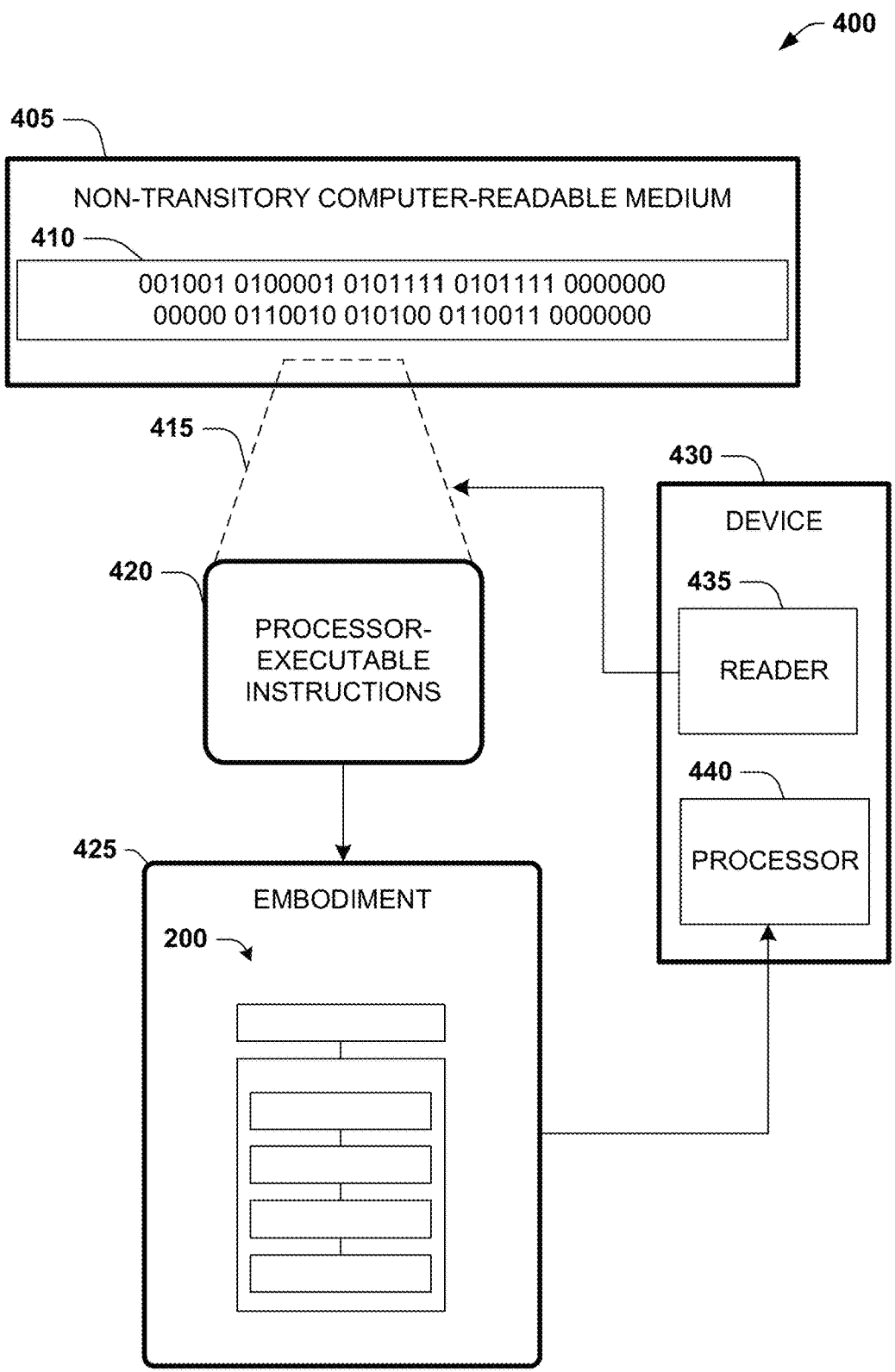
FIG. 4 illustrates an embodiment of a non-transitory computer-readable medium.

FIG. 4 is an illustration of a scenario 400 involving an example non-transitory computer-readable medium 405. In one embodiment, one or more of the components described herein are configured as program modules, such as the controlling module 105, stored in the non-transitory computer-readable medium 405. The program modules are configured with stored instructions, such as processor-executable instructions 420, that when executed by at least a processor, such as processor 440, cause the computing device to perform the corresponding function(s) as described herein. In one embodiment, the, functionality of the controlling module 105, stored in the non-transitory computer-readable medium 405, may be executed by the processor 440 as the processor-executable instructions 420 to perform an embodiment 425 of the method 200 of FIG. 2.

The non-transitory computer-readable medium 405 includes the processor-executable instructions 420 that when executed by a processor 440 cause performance of at least some of the provisions herein. The non-transitory computer-readable medium 405 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 405 stores computer-readable data 410 that, when subjected to reading 415 by a reader 435 of a device 430 (e.g., a read head of a hard disk drive, or a read operation invoked on a solid-state storage device), express the processor-executable instructions 420.

In some embodiments, the processor-executable instructions 420, when executed cause performance of operations, such as at least some of the example method 200 of FIG. 2, for example. In some embodiments, the processor-executable instructions 420 are configured to cause implementation of a system, such as at least some of the example system 100 of FIG. 1, for example.

Figure 5:
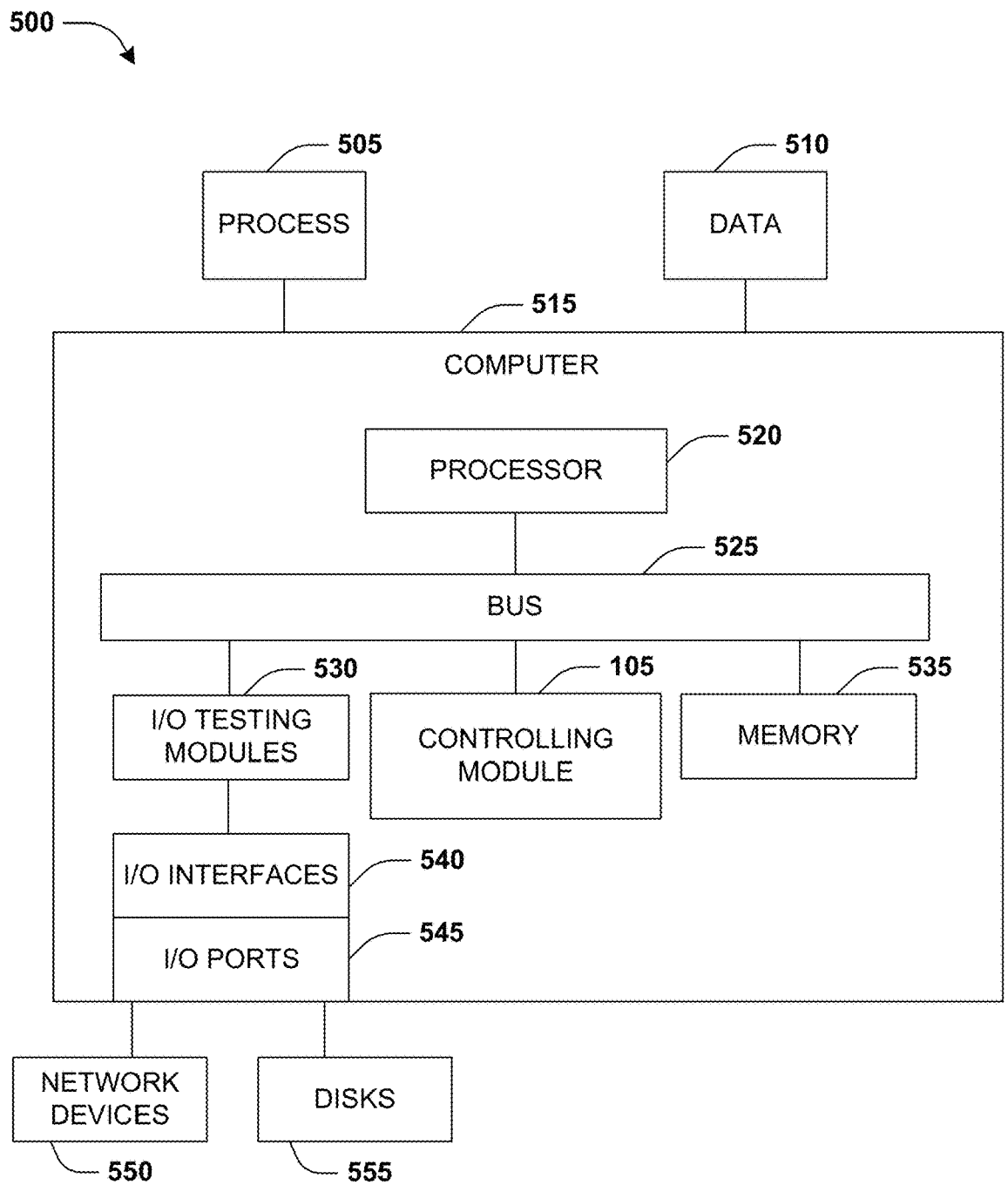
FIG. 5 illustrates an embodiment of a computing system configured with the example systems and/or methods disclosed.

FIG. 5 illustrates an example computing device 500 that is configured and/or programmed with one or more of embodiments and/or features of the disclosed systems and methods described herein, and/or equivalents. The computing device 500 may be the computer 515 that includes a processor 520, a memory 535, and input/output (I/O) ports 545 operably connected by a bus 525. In one embodiment, the, the computer 515 may include logic of the controlling module 105 configured to facilitate the system 100 and/or the method 200 shown in FIGS. 1-2. In different embodiments, the logic of the controlling module 105 may be implemented in hardware, a non-transitory computer-readable medium 505 with stored instructions, firmware, and/or combinations thereof. While the logic of the controlling module 105 is illustrated as a hardware component attached to the bus 525, it is to be appreciated that in other embodiments, the logic of the controlling module 105 could be implemented in the processor 520, stored in memory 535, or stored in disk 555.

In one embodiment, logic of the controlling module 105 or the computer 515 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 515 as data 510 that are temporarily stored in memory 535 and then executed by processor 520.

The logic of the controlling module 105 may also provide means (e.g., hardware, non-transitory computer-readable medium 505 that stores executable instructions, firmware) for performing rule based source sequencing for allocation.

Generally describing an example configuration of the computer 515, the processor 520 may be a variety of various processors including dual microprocessor and other multi-processor architectures. The memory 535 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 555 may be operably connected to the computer 515 via, for example, the I/O interface 540 (e.g., card, device) and the I/O ports 545. The disks 555 may be, for example, a magnetic disk drive, a solid state disk drive, a floppy disk drive, a tape drive, a Zip drive, a flash memory card, a memory stick, and so on. Furthermore, the disks 555 may be a CD-ROM drive, a CD-R drive, a CD-RW drive, a DVD ROM, and so on. The memory 535 can store a process, such as within the non-transitory computer-readable medium 505, and/or data 510, for example. The disk 555 and/or the memory 535 can store an operating system that controls and allocates resources of the computer 515.

The computer 515 may interact with I/O devices via the I/O interfaces 540 and the I/O ports 545. The I/O devices may be, for example, a keyboard, a microphone, a pointing and selection device, cameras, video cards, displays, the disks 555, the network devices 550, and so on. The I/O ports 545 may include, for example, serial ports, parallel ports, and USB ports. I/O controllers 530 may connect the I/O interfaces 540 to the bus 525.

The computer 515 can operate in a network environment and thus may be connected to the network devices 550 via the I/O interfaces 540, and/or the I/O ports 545. Through the network devices 550, the computer 515 may interact with a network. Through the network, the computer 515 may be logically connected to remote computers (e.g., the computer 515 may reside within a distributed computing environment to which clients may connect). Networks with which the computer 515 may interact include, but are not limited to, a local area network (LAN), a new area network (WAN), and other networks.

Figure 6:
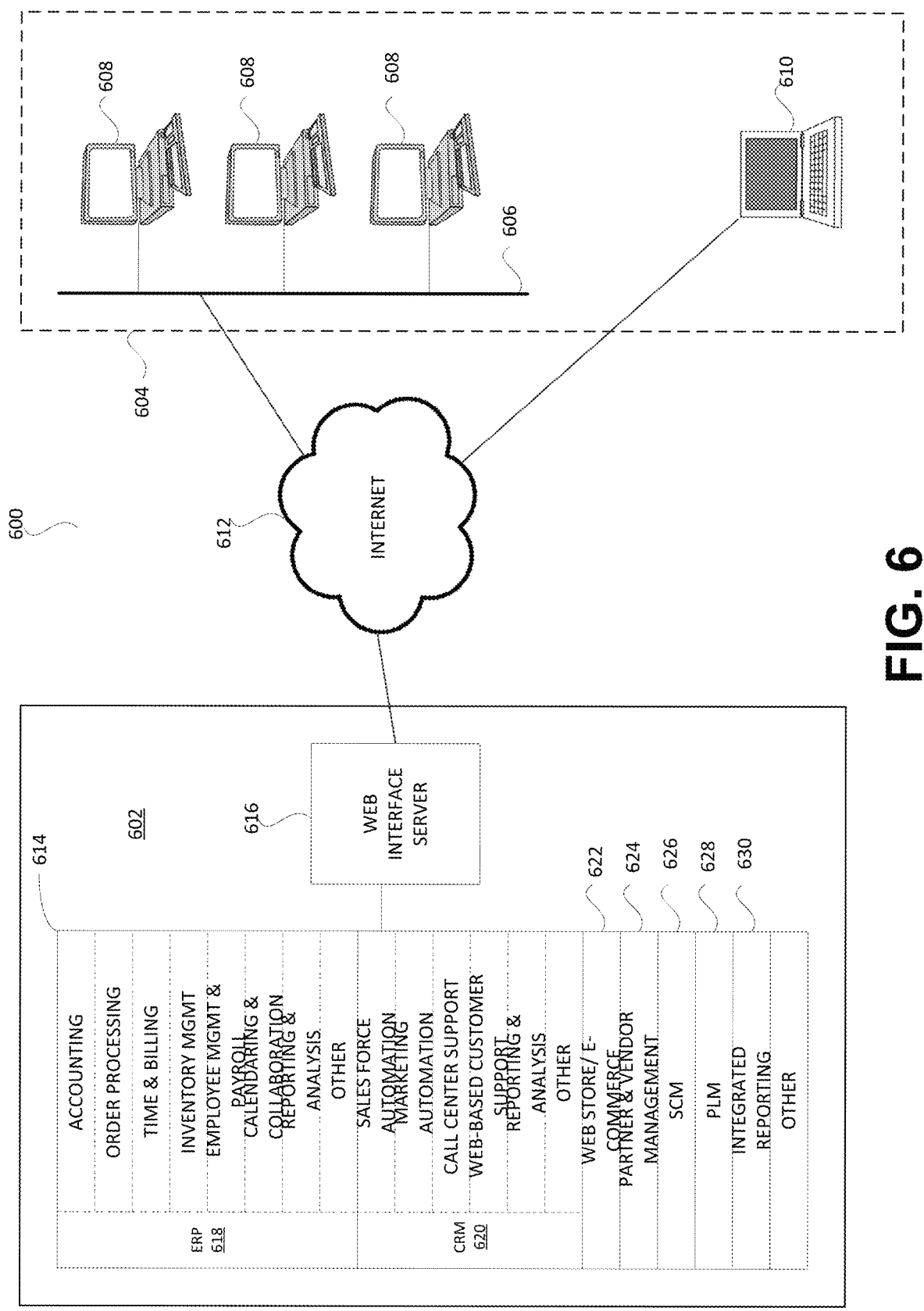
FIG. 6 illustrates an embodiment of an integrated business system and an enterprise network in which an embodiment of the invention may be implemented.

FIG. 6 is a diagram illustrating a system 600 in which an embodiment of the invention may be implemented. Enterprise network 604 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection.

For simplicity and clarity of explanation, the enterprise network 604 is represented by an on-site local area network 606 to which a plurality of personal computers 608 are connected, each generally dedicated to a particular end user, such as a service agent or other employee (although such dedication is not required), along with an exemplary remote user computer 610 that can be, for example, a laptop computer or tablet computer of a traveling employee having internet access through a public Wi-Fi access point, or other internet access method. The end users (consumers) associated with computers 608 and 610 may possess an internet-enabled smartphone or other electronic device (such as a PDA, tablet, laptop computer) having wireless internet access or other synchronization capabilities. Users of the enterprise network 604 interface with the integrated business system 602 across the Internet 612 or another suitable communications network or combination of networks.

Integrated business system 602, which may be hosted by a dedicated third party, may include an integrated business server 614 and a web interface server 616, coupled as shown in FIG. 6. It is to be appreciated that either or both of the integrated business server 614 and the web interface server 616 may be implemented on one or more different hardware systems and components, even though represented as singular units in FIG. 6.

In a typical example in which system 602 is operated by a third party for the benefit of multiple account owners/tenants, each of whom is operating a business, integrated business server 614 comprises an ERP module 618 and further comprises a CRM module 620. In many cases, it will be desirable for the ERP module 618 to share methods, libraries, databases, subroutines, variables, etc., with CRM module 620, and indeed ERP module 618 may be intertwined with CRM module 620 into an integrated Business Data Processing Platform (which may be single tenant, but is typically multi-tenant).

The ERP module 618 may include, but is not limited to, a finance and accounting module, an order processing module, a time and billing module, an inventory management and distribution module, an employee management and payroll module, a calendaring and collaboration module, a reporting and communication module, and other ERP-related modules. The CRM module 620 may include, but is not limited to, a sales force automation (SFA) module, a marketing automation module, a contact list module (not shown), a call center support module, a web-based customer support module, a reporting and communication module, and other CRM-related modules.

The integrated business server 614 (or multi-tenant data processing platform) further may provide other business functionalities including a web store/eCommerce module 622, a partner and vendor management module 624, and an integrated reporting module 630. An SCM (supply chain management) module 626 and PLM (product lifecycle management) module 628 may also be provided. Web interface server 616 is configured and adapted to interface with the integrated business server 614 to provide one or more web-based user interfaces to end users of the enterprise network 604.

The integrated business system shown in FIG. 6 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, for example by hosting a website, to client web browsers that access the web server via the Internet.

Figure 7:
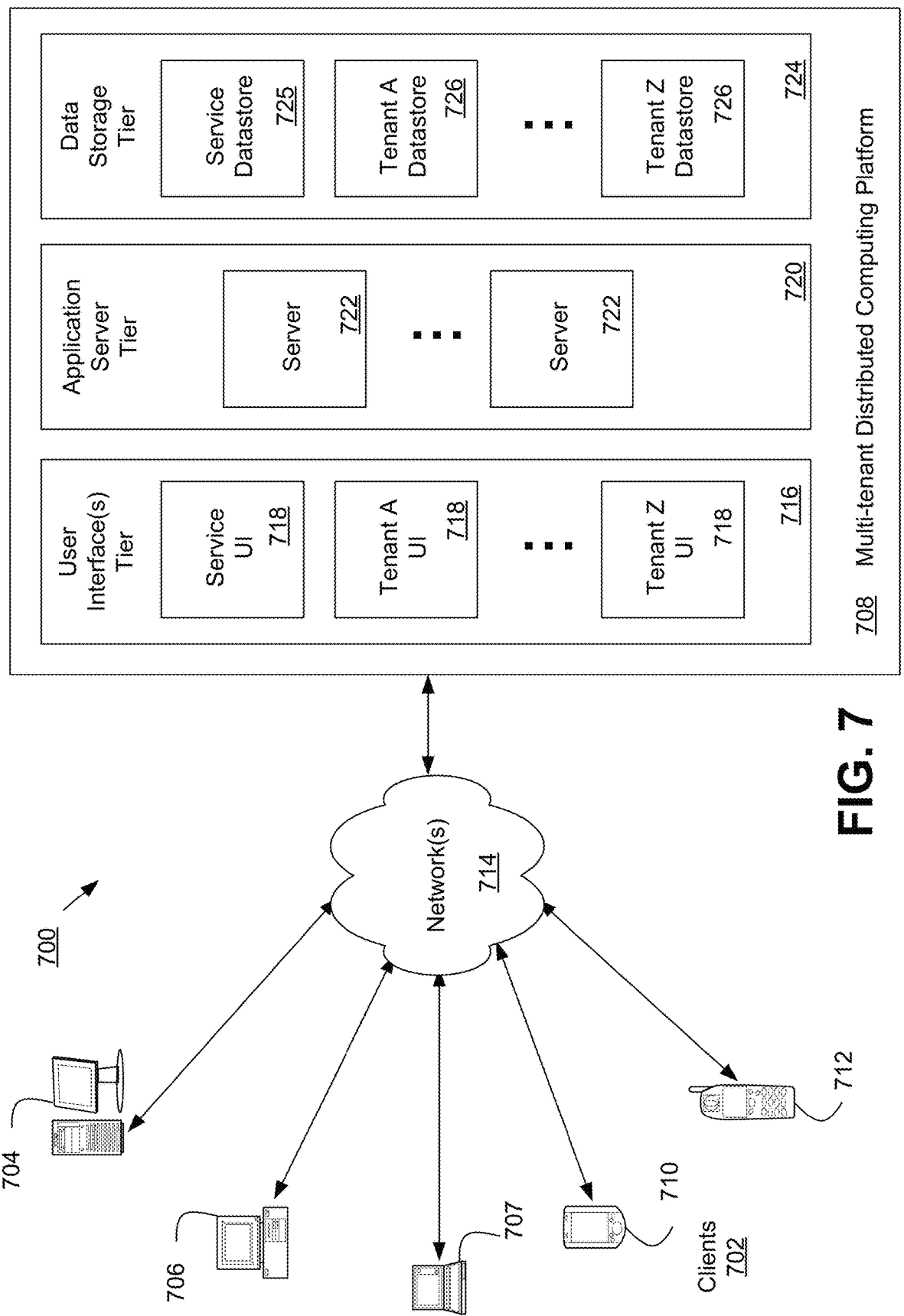
FIG. 7 illustrates an embodiment of a multi-tenant distributed computing service platform.

FIG. 7 is a diagram illustrating elements or components of an example operating environment 700 in which one or more embodiments or features of the disclosed system may be implemented. As shown, a variety of clients 702 incorporating and/or incorporated into a variety of computing devices may communicate with a distributed computing service/platform 708 through one or more networks 714. For example, a client may incorporate and/or be incorporated into a client application (e.g., software) implemented at least in part by one or more of the computing devices.

Examples of computing devices that may be configured, customized, and programmed to implement one or more embodiments of the disclosed system and/or methods include personal computers, server computers 704, desktop computers 706, laptop computers 708, notebook computers, tablet computers or personal digital assistants (PDAs) 710, smart phones 712, cell phones, and consumer electronic devices incorporating one or more computing device components, such as one or more electronic processors, microprocessors, central processing units (CPU), or controllers. Examples of networks 714 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 708 may include multiple processing tiers, including a user interface tier 716, an application server tier 720, and a data storage tier 724. The user interface tier 716 may maintain multiple user interfaces 718, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 724 may include one or more data stores, which may include a Service Data store 725 and one or more Tenant Data stores 726.

Each tenant data store 726 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 708 may be multi-tenant and service platform 708 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that is implemented and configured to integrate the capabilities of several historically separate computing systems into a centralized system, with the intention of streamlining functional processes and increasing efficiencies on a business-wide level.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions.

In addition to ERP and CRM functions, a business information system/platform (such as element 708 of FIG. 7(A)) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 722 that are part of the platform's Application Server Tier 720.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 708 of FIG. 7).

As noted with regards to FIG. 6, the integrated business system shown in FIG. 7 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions.

Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by at least a processor of a computer cause the computer to:
   receive, by at least the processor, weather information for a plurality of geographical regions;
   receive, by at least the processor, load information from a plurality of meters located in the plurality of geographical regions;
   generate, by at least the processor, a load profile for each of the geographical regions, wherein each load profile is generated based upon (i) weather information corresponding to a geographical region and (ii) load information corresponding to one or more meters located within the geographical region;
   store the load profile for each geographical region;
   determine a first weather factor impacting a first load profile of a first geographical region to create a second load profile for the first geographical region;
   determine a third load profile of the first geographical region based upon an average of the first and second load profiles;
   predict, by at least the processor, a loading for each geographical region of the geographical regions based upon the load profiles for the geographical region;
   determine, by at least the processor, whether the predicted loading for each geographical region exceeds a defined threshold;
   control a display screen, by at least the processor, in response to a first predicted loading for the first geographical region exceeding the defined threshold, to cause the display screen to display and visually distinguish a graphical representation of the first geographical region from graphical representations of other geographical regions;
   in response to the first predicted loading exceeding the defined threshold, provide a plurality of corrective actions;
   score each of the plurality of corrective actions;

select the corrective action having the highest score, from amongst the plurality of corrective actions; and
control transmission of instructions to a computing device to cause the corrective action having the highest score to be implemented.

2. The non-transitory computer-readable medium of claim 1, further comprising instructions that when executed by at least the processor cause the computer to:
determine whether a distributed energy resource is installed in the first geographical region;
in response to determining that the distributed energy resource is installed in the first geographical region, determine supplemental load information associated with the distributed energy resource; and
generate or update a fourth load profile for the first geographical region based upon the load information for the first geographical region and the supplemental load information.

3. The non-transitory computer-readable medium of claim 1, further comprising instructions that when executed by at least the processor cause the computer to:
determine a weather factor impacting the supplementation of energy via a distributed energy resource;
determine supplemental load information based upon a value of the weather factor associated with a first time; and
predict a first load for the first geographical region in association with the first time based upon the supplemental load information.

4. The non-transitory computer-readable medium of claim 3, further comprising instructions that when executed by at least the processor cause the computer to:
determine second supplemental load information based upon a second value of the weather factor associated with a second time; and
predict a second load for the first geographical region in association with the second time based upon the second supplemental load information.

5. The non-transitory computer-readable medium of claim 1, wherein the received weather information includes temperature information for the plurality of geographical regions, and wherein each load profile is generated based upon at least some of the temperature information, at least some of the received load information and time intervals.

6. The non-transitory computer-readable medium of claim 1, wherein the received weather information includes cloud cover information for the plurality of geographical regions, and wherein each load profile is generated based upon at least some of the cloud cover information, at least some of the received load information and time intervals.

7. A computing system, comprising:
a processor connected to memory; and
a controlling module stored on a non-transitory computer readable medium and configured with instructions that when executed by the processor cause the processor to:
receive weather information for a plurality of geographical regions;
receive load information from a plurality of meters located in the plurality of geographical regions;
generate a load profile for each of the geographical regions, wherein each load profile is generated based upon (i) weather information corresponding to a geographical region and (ii) load information corresponding to one or more meters located within the geographical region;
store the load profile for each geographical region;
determine a first weather factor impacting a first load profile of a first geographical region to create a second load profile for the first geographical region;
determine a third load profile of the first geographical region based upon an average of the first and second load profiles;
predict a loading for each geographical region of the geographical regions based upon the load profiles for the geographical region;
determine whether the predicted loading for each geographical region exceeds a defined threshold;
control a display screen to generate and display, in response to a first predicted loading for the first geographical region exceeding the defined threshold, a graphical representation of the first geographical region that is visually distinguishable from other displayed graphical representations of other geographical regions;
in response to the first predicted loading exceeding the defined threshold, provide a plurality of corrective actions;
score each of the plurality of corrective actions;
select the corrective action having the highest score, from amongst the plurality of corrective actions; and
control transmission of instructions to a computing device to cause the corrective action having the highest score to be implemented.

8. The computing system of claim 7, wherein the controlling module is further configured with instructions that when executed by the processor cause the processor to:
determine whether a distributed energy resource is installed in the first geographical region;
in response to determining that the distributed energy resource is installed in the first geographical region, determine supplemental load information associated with the distributed energy resource; and
generate or update a fourth load profile for the first geographical region based upon the load information for the first geographical region and the supplemental load information.

9. The computing system of claim 7, wherein the controlling module is further configured with instructions that when executed by the processor cause the processor to:
determine a weather factor impacting the supplementation of energy via a distributed energy resource;
determine supplemental load information based upon a value of the weather factor associated with a first time; and
predict a first load for the first geographical region in association with the first time based upon the supplemental load information.

10. The computing system of claim 9, wherein the controlling module is further configured with instructions that when executed by the processor cause the processor to:
determine second supplemental load information based upon a second value of the weather factor associated with a second time; and
predict a second load for the first geographical region in association with the second time based upon the second supplemental load information.

11. The computing system of claim 7, wherein the received weather information includes temperature information for the plurality of geographical regions, and wherein each load profile is generated based upon at least some of the temperature information, at least some of the received load information and time intervals.

12. The computing system of claim 7, wherein the received weather information includes cloud cover information for the plurality of geographical regions, and wherein each load profile is generated based upon at least some of the cloud cover information, at least some of the received load information and time intervals.

13. A computer-implemented method performed by a computing device comprising a processor, the computer-implemented method comprising:
receiving, by at least the processor, weather information for a plurality of geographical regions;
receiving, by at least the processor, load information from a plurality of meters located in the plurality of geographical regions;
generating, by at least the processor, a load profile for each of the geographical regions, wherein each load profile is generated based upon (i) weather information corresponding to a geographical region and (ii) load information corresponding to one or more meters located within the geographical region;
storing the load profile for each geographical region;
determining a first weather factor impacting a first load profile of a first geographical region to create a second load profile for the first geographical region;
determining a third load profile of the first geographical region based upon an average of the first and second load profiles;
predicting, by at least the processor, a loading for each geographical region of the geographical regions based upon the load profiles for the geographical region;
determining, by at least the processor, whether the predicted loading for each geographical region exceeds a defined threshold;
controlling, by at least the processor, a display screen to generate and display, in response to a first predicted loading for a first geographical region exceeding the defined threshold, a graphical representation of the first geographical region that is visually distinguished from graphical representations of other geographical regions displayed on the display screen;
in response to the first predicted loading exceeding the defined threshold, provide a plurality of corrective actions;
score each of the plurality of corrective actions;
select the corrective action having the highest score, from amongst the plurality of corrective actions; and
control transmission of instructions to a computing device to cause the corrective action having the highest score to be implemented.

14. The computer-implemented method of claim 13, further comprising:
determining whether a distributed energy resource is installed in the first geographical region;
in response to determining that the distributed energy resource is installed in the first geographical region, determining supplemental load information associated with the distributed energy resource; and
generating or updating a fourth load profile for the first geographical region based upon the first load information for the first geographical region and the supplemental load information.

15. The computer-implemented method of claim 13, further comprising:
determining a weather factor impacting the supplementation of energy via a distributed energy resource;
determining supplemental load information based upon a value of the weather factor associated with a first time;
predicting a first load for the first geographical region in association with the first time based upon the supplemental load information;
determining second supplemental load information based upon a second value of the weather factor associated with a second time; and
predicting a second load for the first geographical region in association with the second time based upon the second supplemental load information.

16. The computer-implemented method of claim 13, wherein the received weather information includes temperature information for the plurality of geographical regions, and wherein each load profile is generated based upon at least some of the temperature information, at least some of the received load information and time intervals.

17. The computer-implemented method of claim 13, wherein the received weather information includes cloud cover information for the plurality of geographical regions, and wherein each load profile is generated based upon at least some of the cloud cover information, at least some of the received load information and time intervals.

* * * * *

UNITED STATES PATENT AND TRADEMARK OFFICE
CERTIFICATE OF CORRECTION

PATENT NO. : 10,761,500 B2  
APPLICATION NO. : 16/010632  
DATED : September 1, 2020  
INVENTOR(S) : Langford et al.

Page 1 of 1

It is certified that error appears in the above-identified patent and that said Letters Patent is hereby corrected as shown below:

On the Title Page

Item (72) Inventors, Line 5, delete "Minnestrista" and insert -- Minnetrista --, therefor.

In the Claims

In Column 24, Line 15, in Claim 14, after "the" delete "first".

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*